(12) United States Patent
Hessler et al.

(10) Patent No.: US 10,492,150 B2
(45) Date of Patent: Nov. 26, 2019

(54) WIRELESS DEVICE, A NETWORK NODE AND METHODS PERFORMED THEREBY FOR COMMUNICATING WITH EACH OTHER

(71) Applicant: Telefonaktiebolaget LM Ericsson (publ), Stockholm (SE)

(72) Inventors: Martin Hessler, Linköping (SE); Emil Björnson, Linköping (SE); Erik G. Larsson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/526,395

(22) PCT Filed: Feb. 2, 2016

(86) PCT No.: PCT/SE2016/050080
§ 371 (c)(1),
(2) Date: May 12, 2017

(87) PCT Pub. No.: WO2017/135852
PCT Pub. Date: Aug. 10, 2017

(65) Prior Publication Data
US 2018/0070321 A1  Mar. 8, 2018

(51) Int. Cl.
*H04W 52/24* (2009.01)
*H04W 52/32* (2009.01)
*H04W 72/04* (2009.01)

(52) U.S. Cl.
CPC ......... *H04W 52/32* (2013.01); *H04W 52/241* (2013.01); *H04W 52/243* (2013.01); *H04W 52/245* (2013.01); *H04W 72/04* (2013.01)

(58) Field of Classification Search
CPC ............ H04W 52/146; H04W 52/241; H04W 52/243; H04W 52/245; H04W 52/32; H04W 52/325; H04W 72/04
See application file for complete search history.

(56) References Cited

U.S. PATENT DOCUMENTS

| | | | |
|---|---|---|---|
| 2011/0170431 A1* | 7/2011 | Palanki | H04W 52/245 370/252 |
| 2016/0100383 A1* | 4/2016 | Simonsson | H04L 5/0046 455/450 |

(Continued)

FOREIGN PATENT DOCUMENTS

| | | |
|---|---|---|
| EP | 2849504 A1 | 3/2015 |
| EP | 3139669 A1 | 3/2017 |
| WO | 2015168930 A1 | 11/2015 |

OTHER PUBLICATIONS

Communication pursuant to Article 94(3) EPC for European Patent Application No. 16705855.1, dated Jun. 5, 2019, pp. 6.

*Primary Examiner* — Khaled M Kassim
*Assistant Examiner* — Zhaohui Yang
(74) *Attorney, Agent, or Firm* — Sage Patent Group

(57) ABSTRACT

A wireless device, a network node and respective methods performed thereby for communicating with each other are provided. The method performed by the wireless device comprises determining (120) a first interference level indication of a first frequency resource; and determining (125) a second interference level indication of a second frequency resource. The method (100) further comprises transmitting (130) a first uplink reference signal on the first frequency resource with a first transmission power, and transmitting (135) a second uplink reference signal on the second frequency resource with a second transmission power, wherein the first transmission power is based on the first- and second interference level indications.

23 Claims, 7 Drawing Sheets

(56) References Cited

U.S. PATENT DOCUMENTS

2017/0055227 A1* 2/2017 Wu .................... H04W 52/24
2017/0311332 A1* 10/2017 Hong .................... H04J 11/00
2018/0048370 A1* 2/2018 Cai .................... H04B 7/0617
2018/0132190 A1* 5/2018 Jeon .................... H04W 52/383

* cited by examiner

WIRELESS DEVICE, A NETWORK NODE AND METHODS PERFORMED THEREBY FOR COMMUNICATING WITH EACH OTHER

TECHNICAL FIELD

The present disclosure relates to wireless communication and in particular to a wireless device and a network node communicating with each other.

BACKGROUND

Mobile data traffic is growing exponentially due to the enormous success of smart phones, tablets and other data traffic appliances. One of the key difficulties in delivering high data rates is the natural variability of the radio propagation channels. Power control and adaptive modulation and coding are classical methods that adapt the signal quality and data rates to the current radio channel conditions. The may be used to combat channel fading to achieve a constant data rate. Alternatively, the instantaneous data rate may be adapted to the instantaneous channel fading, to send more data when the channel has favourable conditions and less when it is unfavourable. These methods may be applied both over time and over frequency subcarriers. The power and modulation adaptation need to be re-determined over the same time/frequency scale as the channel varies. Since substantial channel variations may occur over a few milliseconds and a few hundred kHz, this calls for cumbersome channel estimation and feedback mechanisms.

Network nodes equipped with a large number of antennas may simultaneously schedule multiple wireless devices, or terminals, at the same time/frequency band and communicate using simple linear processing such as Maximum-Ratio, MR, and Zero-Forcing, ZF. This is an attractive approach to handle the increasing data traffic, since it does not require a denser network deployment and since each network node may control the interference that it causes to its local area. Using many antennas at the network node along with appropriately chosen precoding results in an effective channel between the network node and the wireless device that is substantially independent of the small-scale fading and looks flat over frequency. This property is often referred to as channel hardening. Systems with many antennas are often referred to as massive multi-user Multiple-Input-Multiple-Output, MIMO, abbreviated by massive MIMO hereafter.

While the channel hardening property leads to effective precoded channels with very small time and frequency variations in terms of Signal to Noise Ratio, SNR, the received signals are also affected by interference from other cells or other systems, operating in the same or in adjacent bands. The interference power, or level, may vary rapidly over time and frequency, due to lack of channel hardening and/or fast resource allocation variations in the vicinity of the cell. This effect is sometimes known as "flashlight" interference. These variations cannot be measured at the network node; thus existing technologies require feedback mechanisms where the wireless device reports the interference level at different subcarriers. The feedback load is cumbersome since the interference may be highly frequency selective and time varying.

SUMMARY

The object is to obviate at least some of the problems outlined above. In particular, it is an object to provide a wireless device, a network node and respective methods performed thereby for communicating with each other. These objects and others may be obtained by providing a wireless device and a network node and a method performed by a wireless device and a network node according to the independent claims attached below.

According to an aspect, a method performed by a wireless device for communicating with a network node in a wireless communication network is provided. The method comprises determining a first interference level indication of a first frequency resource; and determining a second interference level indication of a second frequency resource. The method further comprises transmitting a first uplink reference signal on the first frequency resource with a first transmission power, and transmitting a second uplink reference signal on the second frequency resource with a second transmission power, wherein the first transmission power is based on the first- and second interference level indications.

According to an aspect, a method performed by a network node for communicating with wireless device in a wireless communication network employing time and frequency multiplexing is provided. The method comprises receiving a first uplink reference signal on a first frequency resource with a first received signal strength; receiving a second uplink reference signal on a second frequency resource with a second received signal strength; and scheduling a downlink data transmission to the wireless device on one or more of the first and second frequency resources based on the first- and the second received signal strengths.

According to an aspect, a wireless device for communicating with a network node in a wireless communication network is provided. The wireless device is configured for determining a first interference level indication of a first frequency resource; and for determining a second interference level indication of a second frequency resource. The wireless device is further configured for transmitting a first uplink reference signal on the first frequency resource with a first transmission power, and transmitting a second uplink reference signal on the second frequency resource with a second transmission power, wherein the first transmission power is based on the first- and second interference level indications.

According to an aspect, a network node for communicating with wireless device in a wireless communication network employing time and frequency multiplexing is provided. The network node is configured for receiving a first uplink reference signal on a first frequency resource with a first received signal strength; for receiving a second uplink reference signal on a second frequency resource with a second received signal strength; and for scheduling a downlink data transmission to the wireless device on one or more of the first and second frequency resources based on the first- and the second received signal strengths.

The method performed by the wireless device, the method performed by the network node, as well as the wireless device and the network node have several advantages. One possible advantage is that a massive MIMO system may be implemented with less overhead from CSI/CQI (Channel Quality Indication) reporting in the uplink. The interference level may be reported by the wireless device using existing reference/pilot signals without requiring a separate measurement report. Furthermore, the wireless device may affect the downlink power control and modulation/coding selection, which may be utilised to optimise the downlink performance. Another possible advantage is that the channel estimation at the network node may be improved for good resources that are likely to be used for downlink transmissions by allocating power to good resources with a favourable interference situation. This is because wireless devices that are heavily interfered on some resources do not send as much power that interfere with other uplink pilots on these resources that will not be used for downlink data transmissions, hence also addressing pilot-contamination both intra and inter cell.

BRIEF DESCRIPTION OF DRAWINGS

Embodiments will now be described in more detail in relation to the accompanying drawings, in which.

DETAILED DESCRIPTION

Briefly described, a wireless device, a network node and respective methods performed thereby for communicating with each other are provided. The wireless device receives a downlink transmission and performs measurements on at least two frequency resources and determines at least two interference level indications associated with the frequency resources. The wireless device then notifies the network node either only about the fact that there is interference present or alternatively a measure of the present interference. The wireless device does not send a conventional measurement report to the network node but instead modifies or determines respective transmission powers with which to transmit uplink reference signals. Generally, in case of interference, the wireless device reduces the transmission power with which to transmit uplink reference signals to the network node, wherein the reduction may be proportional to the level of interference in the manner that the more interference present, the lower the transmission power with which to transmit uplink reference signals to the network node.

The methods and the wireless device and the network node utilise measured signal and interference characteristics at the wireless device to adapt the uplink reference signalling, for example, in terms of offsetting its transmit power to indicate favourable or unfavourable interference conditions. This enables the wireless device to efficiently influencing the resource allocation decisions made at the network node so that the network node may compensate for the fast-varying interference. In a 5G (fifth generation) massive MIMO system, the wireless device may signal information to the network node about currently experienced interference conditions, and even request changes in the downlink power allocation and modulation/coding, without transmitting any explicit feedback of the measured interference levels over the conventional control plane, e.g. by means of a measurement report.

Embodiments herein relate to a method performed by a wireless device for communicating with a network node in a wireless communication network. Embodiments of such a method will now be described with reference to FIG. 1.

Figure 1:
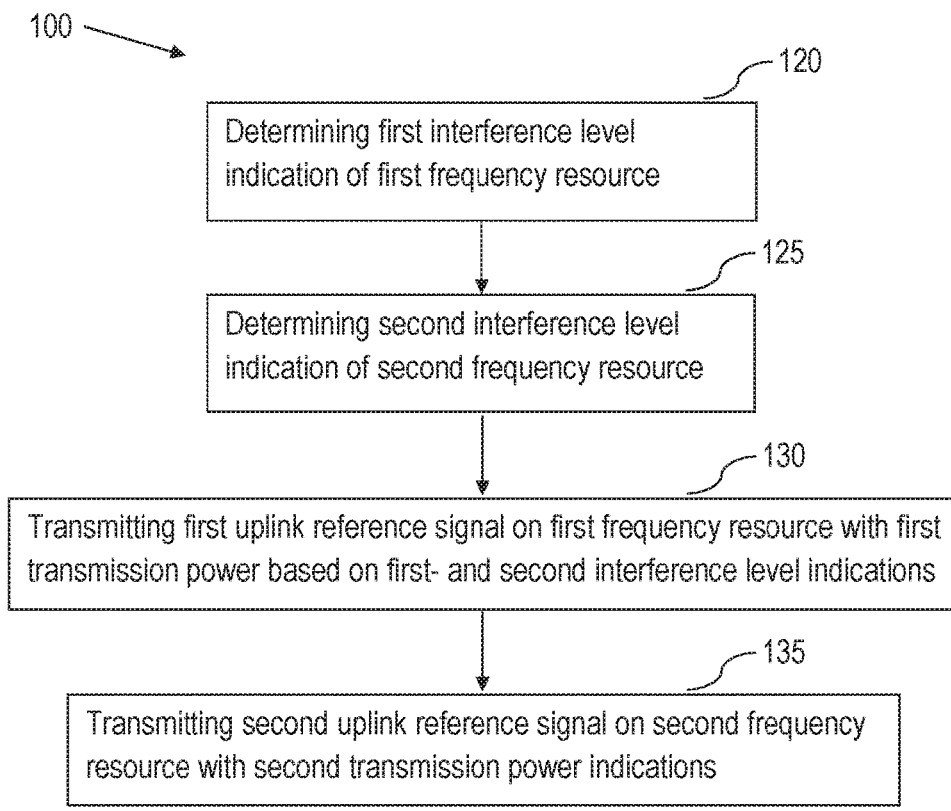
FIG. 1 is a flowchart of a method performed by a wireless device for communicating with a network node in a wireless communication network, according to an exemplifying embodiment.

FIG. 1 illustrates the method 100 comprising determining 120 a first interference level indication of a first frequency resource; and determining 125 a second interference level indication of a second frequency resource. The method 100 further comprises transmitting 130 a first uplink reference signal on the first frequency resource with a first transmission power, and transmitting 135 a second uplink reference signal on the second frequency resource with a second transmission power, wherein the first transmission power is based on the first- and second interference level indications.

Network nodes in the wireless communication network communicating with wireless devices generally transmit reference signals of different types. The reference signals may be used by wireless devices e.g. to perform measurements associated with e.g. channel quality and to obtain information about demodulation of received data signals. In the same manner, wireless devices also transmit reference signals if different types in order for the network nodes to e.g. perform measurements associated with e.g. channel quality and to obtain information about demodulation of received data signals. Channel quality may be defined or measured in various ways, e.g. Signal to Noise and Interference (SINR), Bit Error Rate (BER). There are many different examples of reference signals, some non-limiting examples are DeModulation reference Signal (MARS), Sounding Reference Signal (SRS), Cell-specific Reference Signal (CRS) and Channel State Information Reference Signal (CSI-RS). Some reference signals may be said to be specific for the wireless device, i.e. the reference signals are intended for the wireless device; and some reference signals may be said to be common reference signals, i.e. intended for all wireless devices being connected to, or communicating with, the network node.

The wireless communication network may employ time and frequency multiplexing, wherein data and reference signals are transmitted by means of frequency resources. An example of a wireless communication network employing time and frequency multiplexing is Long Term Evolution, LTE, employing Orthogonal Frequency Division Multiplexing. Frequency resources may be defined in various ways, e.g. a Physical Resource Block (PRB), which comprises a number of contiguous subcarriers. Another example of a definition of a frequency resource is one subcarrier. Still another example is a set of two or more subcarriers which may or may not correspond to a PRB, i.e. the number of subcarriers of the frequency resource may be less, the same or more than the number of subcarriers of the PRB. The subcarriers of the set may be contiguous or non-contiguous. LTE is also referred to as a 4G (fourth generation) system/ technology. A frequency resource may thus comprise a set of subcarriers and/or frequency resources with a bandwidth less than a full system bandwidth.

The network node thus performs a transmission to the wireless device, the transmission being associated with at least two frequency resources. The transmission being associated with at least two frequency resources means that the transmission is performed on or carried by the at least two frequency resources. The wireless device thus received the transmission and determines 120 the first interference level indication of the first frequency resource; and determines 125 the second interference level indication of the second frequency resource of the received transmission from the network node. The first and the second interference levels indication may be determined in different ways as will be explained in more detail below. One schematic example how this can be described is as follows:

$$y=Hs+e,$$

where H is the effective channel including power and beam-forming, s is the unite norm signal and e is some additive error term typically assumed to be close to white Gaussian noise with variance $\sigma^2$. Hence different methods can be envisioned how to estimate H, one common method is to use a known pilot-sequence to estimate H and thus also get an estimate of e by comparing the norm of the estimated H to the norm of y.

The interference may be due to transmissions originating in neighbouring cells by neighbouring network nodes or wireless devices in the neighbouring cells. The interference may also be due to transmissions (from wireless devices and the network node) originating in the cell of the network node the wireless device is communicating with. A cell is a coverage area of a network node in a wireless communication network, and a network node may have more than one cell. Determining an interference level indication of a frequency resource may comprise estimating an energy and/or power of undesired/interfering transmissions, on the frequency resource. An undesired/interfering transmission may be caused by transmissions from a neighbouring- and/or serving network node and/or cell. The interference level indication may also be determined by relating to estimated energy/power of a "desired transmission", e.g. a pure transmission from the network node without interference. An interference level indication is an indicator of experienced interference. Determining an interference level indication on a frequency resource may also comprise estimating an energy and/or power of a desired transmission, on the frequency resource. An interference level indication may also be determined by relating estimated and received energy and/or power with a measured received energy and/or power of desired transmissions. Thus, desired transmission(s) may refer to the actual transmission from the network node to the wireless device and undesired transmission(s) may refer to transmissions not intended for the wireless device but adversely affecting desired transmission(s).

Once the wireless device has determined the first interference level indication of the first frequency resource, and the second interference level indication of the second frequency resource, the wireless device informs the network node of at least the fact that there is interference present. Instead of sending a measurement report to the network node, the wireless device transmits 130 the first uplink reference signal on the first frequency resource with the first transmission power, and transmits 135 the second uplink reference signal on the second frequency resource with a second transmission power, wherein the first transmission power is based on the first- and second interference level indications.

Generally, the network node controls the transmission power of the wireless device. The network node generally receives transmissions from a plurality of wireless device being located in various places within the cell or coverage area of the network node. Being in various places in the cell means that the wireless devices generally have different radio channel characteristics with regard to each other. Some wireless devices are relatively far from the network node, some are relatively close, some may have free line of sight towards the network node, some may have obstacles such as buildings, trees, cars etc. between themselves and the network node. All these different circumstances give rise to different radio channel characteristics, wherein different transmission powers are required for different wireless devices in order for the network node to successfully receive the transmissions from the wireless devices in the cell.

The first transmission power is selected, or determined, to inform the network node of the presence of the interference as determined by determining the first- and second interference level indications. As will be explained in more detail below, the first transmission power may be e.g. zero, wherein the wireless device transmits the first uplink reference signal with zero transmission power, which may be interpreted as refraining from transmitting the first uplink reference signal. Doing so will inform the network node that there is interference present on at least one of the first and the second frequency resource. Alternatively, the first transmission power may be determined to reflect the amount or level of interference present on at least one of the first and second frequency resource as indicated by the first and/or the second interference level indication. Generally, the first transmission power is then reduced as compared to a transmission power reflecting no interference present on at least one of the first and the second frequency resource. The amount or size of the reduction of the first transmission power may be indicative of the amount or level of interference present on at least one of the first and the second frequency resource as indicated by the first and/or the second interference level indication. The network node is in this manner informed not only about the fact that there is interference present on at least one of the first and the second frequency resource, but also the amount or size of that interference.

Since the network node generally controls the transmission power of the wireless device based on e.g. various measurements performed by the wireless device and/or the network node, the network node "expects" to receive an upcoming uplink transmission comprising the first and the second uplink reference signals with a certain received signal strength. Both the wireless device and the network node may perform various measurements. These measurements enable the network node to obtain information about the channel quality and characteristics of the channel. The information about the channel quality and characteristics of the channel may also lead to the network node expecting a certain received signal strength for a transmission from the wireless device since the network node may determine the transmission power of the wireless device. Knowing how a transmission comprising various frequencies may be attenuated and/or affected by the channel provides the network node with some level of predictability. Since the wireless device may reduce the first transmission power used for transmitting the first uplink reference signal on the first frequency resource, the network node may receive that first uplink reference signal at reduced received signal strength. The network node may thus conclude that there is interference present. There are then different options for the network node to overcome problems with interference as will be described in more detail below. Very briefly, the network node may, for a subsequent downlink transmission, change a modulation and coding, adapt a beamforming, and/or change transmission power. Observe that these parameters are typically jointly adapted, which is implicit in the description below as a function of the power per frequency resource. Transmitting an uplink reference signal on the first and/or the second frequency resource may be done after and/or in combination with allocating time and/or frequency resources comprising the first and/or the second frequency resource and mapping the uplink reference signal to one or more of the first and/or the second frequency resource and transmitting the uplink reference signal on the first and/or the second frequency resource using a transmission power based on the first- and second interference level indications.

A frequency resource may thus be used for transmission and/or reception of data and/or reference signals and/or control signalling and/or any system information, related to a communication between the wireless and the network node. A transmission and/or reception on a frequency resource may be carried out in different time structures, e.g. in frames, subframes, symbols, TTIs etc. A transmission and/or reception on the same frequency resource may mean that user data and/or reference signals and/or control signalling and/or any system information related to the communication between the wireless device and the network node, is transmitted on and/or received in, at least one time structure on at least one subcarrier within the frequency resource.

The method performed by the wireless device may have several advantages. One possible advantage is that a massive MIMO system may be implemented with less overhead from CSI/CQI (Channel Quality Indication) reporting in the uplink. The interference level may be reported by the wireless device using existing reference/pilot signals without requiring a separate measurement report. Furthermore, the wireless device may affect the downlink power control and modulation/coding selection, which may be utilised to optimise the downlink performance. Another possible advantage is that the channel estimation at the network node may be improved for good resources that are likely to be used for downlink transmissions by allocating power to good resources with a favorable interference situation. This is because wireless devices that are heavily interfered on some resources do not send as much power that interfere with other uplink pilots on these resources that will not be used for downlink data transmissions, hence also addressing pilot-contamination both intra and inter cell.

In an example, the second transmission power is based on the first- and second interference level indications.

As explained above, the first transmission power is based on the first- and second interference level indications. The same may be done for the second transmission power with which the second uplink reference signal is transmitted on the second frequency resource.

In a first example, the second transmission power is the same as the first transmission power. However, in a second example, the second transmission power may be different even though both are based on the first- and second interference level indications. In the second example, two different formulas may be used to determine the first and the second transmission power, wherein both formulas make use of the first- and second interference level indications but the formulas are different.

The first transmission power may further be based on a first radio channel path gain, $\beta_1$, for the first frequency resource and the second transmission power is based on a second radio channel path gain, $\beta_2$, for the second frequency resource.

When the wireless device has received a downlink transmission, the wireless device determines 120 the first interference level indication of the first frequency resource; and determines 125 the second interference level indication of the second frequency resource. The wireless device may further estimate the first radio channel path gain, $\beta_1$, for the first frequency resource and the second radio channel path gain, $\beta_2$, for the second frequency resource based on the received downlink transmission. The different path gains may be e.g. a respective beamforming gain. The different path gains provide information about how the transmission from the network node is affected by the radio channel, i.e. how are the frequency resources affected by e.g. interference due to other transmissions, obstacles and objects in the path between the wireless device and the network node etc. Since the first transmission power may be based on the first- and second interference level indications together with the first radio channel path gain, $\beta_1$; and the second transmission power may be based on the first- and second interference level indications together with the second radio channel path gain, $\beta_2$, it may be that the first and the second transmission power may be different. By e.g. measuring the interference level on the first and second resources of the received downlink transmission and thereby determine the first and the second interference level indication, the wireless device may determine the first and second transmission power, thereby shaping the downlink power and modulation/coding to the measured channel and interference conditions for upcoming downlink transmissions.

To exemplify how the wireless device may influence the downlink resource allocation by its choice of uplink transmission power, suppose that the i-th subcarrier has downlink power $P_i$, the precoded channel has path-gain $\beta_i$, and the interference plus noise power $\sigma_i^2$. The average spectral efficiency over S subcarriers may be computed as:

$$\frac{1}{S}\sum_{i=1}^{S} \log_2\left(1 + \frac{P_i \beta_i}{\sigma_i^2}\right) \qquad (1)$$

under the assumption of having perfect channel state information at the receiver. If the downlink transmit power is limited as $\Sigma_{i=1}^{S} P_i \leq P_{max}$ then the average spectral efficiency may be maximized by water filling:

$$P_i = \left[\alpha - \frac{\sigma_i^2}{\beta_i}\right]_+ \qquad (2)$$

where $[\cdot]_+$ is equal to its argument if it is positive and otherwise zero. The "water level" parameter $\alpha$ is selected to make $\Sigma_{i=1}^S P_i = P_{max}$. Suppose that the wireless device would like the network node to apply this water filling power control, but the network node cannot compute it unless it has access to $\sigma_i^2$. This value may only be measured at the wireless device, while the network node only knows some nominal value $\sigma_{nom}^2$.

However, if the network node estimates $\beta_i$ as $\hat{\beta}_i$ from the uplink reference signal, then the wireless device may influence the estimate such that:

$$\frac{\sigma_{nom}^2}{\hat{\beta}_i} = \frac{\sigma_i^2}{\beta_i} \quad (3)$$

More precisely, suppose that the estimation of $\beta_i$ carried out under the belief that the wireless device transmits the reference signal using a nominal power level $P_{UL-nom}$. Then the wireless device may select its actual transmit power as $P_{UL-nom}\sigma_{nom}^2/\sigma_i^2$ which effectively makes $\hat{\beta}_i = \sigma_{nom}^2/\sigma_i^2$ and results in the BS performing the water filling power allocation as:

$$P_i = \left[\alpha - \frac{\sigma_{nom}^2}{\hat{\beta}_i}\right]_+ \quad (4)$$

Figure 3A:
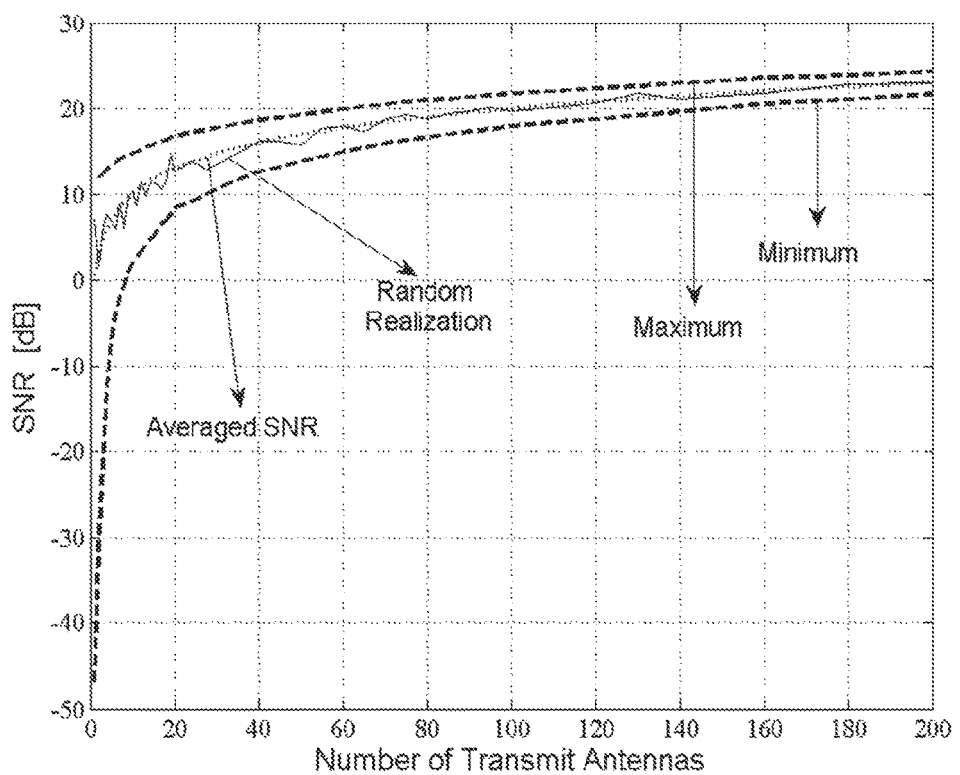
FIG. 3a is an illustration of received Signal to Noise Ratio, SNR, as a function of antennas for a general Multi-Input-Single-Output, MISO, system.
Figure 3B:
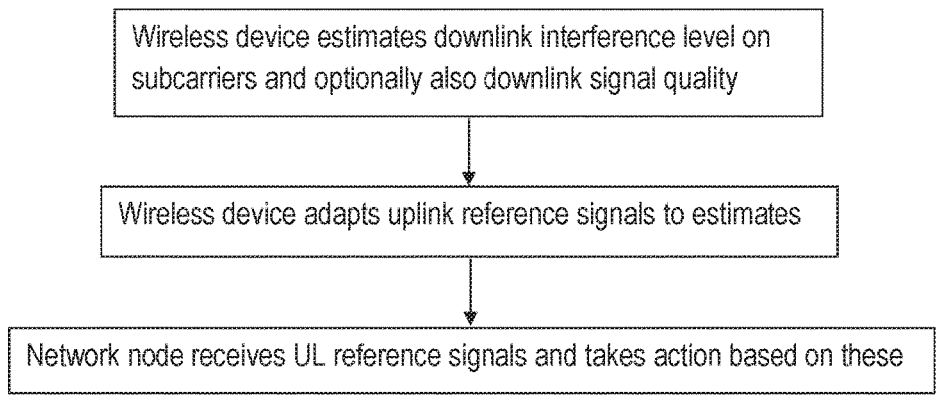
FIG. 3b is a simplified flowchart of the interaction of the method performed by the wireless device and the method performed by the network node.
Figure 3C:
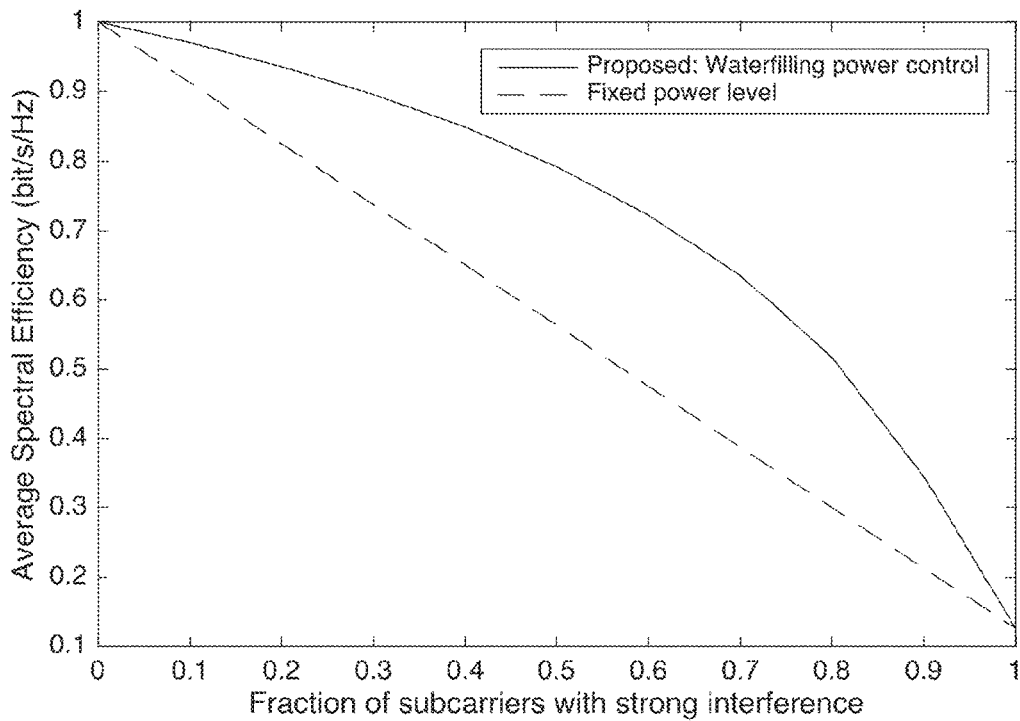
FIG. 3c is an illustration of an average downlink spectral efficiency with the proposed power control and with a fixed power level.

The benefits of this embodiment are illustrated in FIG. 3c, where the average spectral efficiency is shown as a function of the fraction of subcarriers that exhibits strong unexpected interference. The normal transmission is carried out with an effective precoded SNR of 0 dB (under equal transmit power over the subcarriers), while some of the subcarriers are hit by interference that is 10 dB stronger than the desired signals. In the proposed water filling power control, the wireless device adapts the power of its uplink reference signals to enable the network node to carry out water filling power control. This is compared to an equal power level over all the subcarriers. The method achieves substantial improvements in average downlink spectral efficiency. In addition, the method enables the network node to directly adapt its modulation and coding to the actual achievable spectral efficiency, while the fixed power case might result in decoding errors when the network node selects a transmission scheme for 1 bit/s/Hz although the channel only supports a substantially lower rate.

Hence this embodiment is more spectrally efficient than reducing the first and/or the second transmit power to zero but is somewhat more complex in terms of implementation.

The first interference level indication may be determined based on a first downlink reference signal.

Once the wireless device has received the downlink transmission from which the wireless devices determines 120 the first interference level indication of the first frequency resource, and determines 125 the second interference level indication of the second frequency resource. The downlink transmission generally comprises both data signals and reference signals. As described above, there are many different reference signals that may be present in the downlink transmission, e.g. DMRS, CRS and CSI-RS. These examples are non-limiting and the downlink transmission may comprise one or more of the above examples as well as other types of reference signals not exemplified above. Merely as an example, assume the downlink transmission comprises DMRS, i.e. the first downlink reference signal is a DMRS. Then the received signal quality on different subcarriers may be estimated at the wireless device from the used reference symbols of the data transmission. The received signal quality may, for example, be estimated in absolute terms (power) or in relation to an expected received power from the network node. The channel path-gain may be extracted from these estimates or the product of signal power and path-gain may be estimated directly. Assuming the wireless device and the network node has sent at least one uplink and at least one downlink transmission, then by means of the various measurements performed by the wireless device and the network node, the network node determines a transmission power to use for e.g. the downlink transmission. Unless the wireless device is moving relatively rapidly, the channel will not change dramatically. Thereby, the wireless device may expect a certain received signal power or strength—an expected received signal power or strength—, e.g. in relation to a previous received downlink transmission. However, sudden interference may occur having an impact on the channel, wherein the received signal power or strength is different from the expected received signal strength or power. As exemplified directly above, the expected received signal strength with regards to the wireless device may be related to the previously received downlink transmission and its received signal strength under the assumption that the channel conditions are relatively constant between two separate downlink transmissions. In other words, the wireless device may expect a received signal strength which is relatively similar to a received signal strength of a previous transmission under the assumption that the wireless device is not moving too rapidly and that the previous transmission was received with a satisfactorily received signal strength. If the previous transmission was received unsuccessfully or unsatisfactorily, the subsequent transmission may be received with an increased receive signal strength.

The wireless device may also determine 120, 125 the current first and the second interference level indication at different subcarriers using such reference signals. This may, for instance, be achieved by comparing the estimated signal power with the total received power. The interference level may, for example, be estimated as an absolute interference power, as a relative value as compared to the noise, or as a joint interference plus noise level, thereby determining the first and/or the second interference level indication. In another example, the interference level may furthermore be estimated by performing soft signal detection and examining the magnitudes of the bit log-likelihood ratios, thereby determining the first and/or the second interference level indication. These examples are generally applicable to scenarios with a downlink reference signal only from the network node, i.e. the network node serving the wireless device.

In some other examples the interference level indication may be determined by configuring the wireless device with downlink-reference signal(s) from interfering neighbouring network nodes, for example, CSI-RS as in LTE. Using these signals the network node may identify from which neighbouring network node the interfering power originate. This is preferable if coordination is used to take into account if the set of wireless devices scheduled in an interfering network node changes. Observe that in a system operating using spatial multiplexing this is less likely, which is the assumption in a massive MIMO system where every wireless device may be scheduled on the whole downlink bandwidth every TTI unless the load in the system is very high.

The second interference level indication is determined based on a second downlink reference signal.

The second interference level indication may be determined based on the second downlink reference signal in the same manner as the first interference level indication is determined based on the first downlink reference signal, as described above.

In an example, the first transmission power is equal to, or lower, than the second transmission power if the first interference level indication indicates a higher interference level than the second interference level indication.

The first and the second interference level indication may be equal or they may be different. Since the first and the second frequency resource are different, they may suffer different degrees of interference, the degree of interference being indicated by the respective interference level indication. The respective interference level indication may comprise, or be based on, e.g. Reference Signal Received Power, RSRP, Reference Signal Received Quality, RSRQ, Signal to Noise and Interference Ratio, SINR, Channel Quality Indicator, CQI, etc.

As described above, the network node generally controls the transmission power to be used by the wireless device. Consequently, the network node may be said to expect a certain received signal strength of a received uplink transmission due to e.g. its obtained knowledge of the channel and the transmission power it has ordered the wireless device to use. Merely as a very simplified example, assume the network node knows that the channel will attenuate the transmission power for a transmission from the wireless device by 1 "unit" and that the network node requires a received signal strength of 8 units. The network node may thus order the wireless device to perform an uplink transmission using a transmission power of 9 units in order to receive the transmission at a received signal strength of 8 units. As also described above, the wireless device may reduce the transmission power compared to the transmission power specified by the network node; or alternatively just set the transmission power to zero, e.g. when the first and/or the second interference level indication indicates an interference level above a predefined threshold. If the wireless device reduces the transmission power, the wireless device may determine the amount or size of the reduction to be proportional to the interference level indicated by the first and/or the second interference level indication. Reverting to the very simplified example above, the wireless device may determine that the transmission power is to be 6 units due to the determined first and/or second interference level indication. The network node will thus receive the transmission, being transmitted using transmission power of 6 units, at a received signal strength of 5 units due to the 1 unit attenuation by the channel. Consequently, the network node expects to receive the transmission from the wireless device at a transmission power of 8 since it ordered the wireless device to use a transmission power of 9 units. Instead the network node receives the transmission power at the received signal strength of 5 units and may deduce that the there is a 3 unit difference, the 3 units reflecting the level of interference experienced by the wireless device. It is pointed out that this a very simplified example and the use of "units" is merely for illustration of the method. As exemplified directly above, the expected received signal strength with regards to the network node is related to the network node having knowledge about the channel and ordering the wireless device to perform an uplink transmission at a specified transmission power, which would result in a foreseeable received signal strength, i.e. the expected received signal strength, unless something unexpected occurs affecting the channel such as e.g. sudden interference, which is out of control of the network node.

Thus, if the first interference level indication indicates a higher interference level than the second interference level indication, then the first transmission power may be lower than, or perhaps equal to, the second transmission power.

As briefly stated above, the wireless device may determine the first and/or the second transmission power to be zero, which may be seen as refraining from transmitting the first and or the second uplink reference signal. If the wireless device employs this scheme, the wireless device may determine to set the first and/or the second transmission power to be zero when the determined first/second interference level indication of the first/second frequency resource indicate(s) an interference level meeting a threshold. For example, if the first/second interference level indication of the first/second frequency resource indicate(s) an interference level being below the threshold, the wireless device transmits the first/second uplink reference signal using a transmission power as ordered, or indicated, by the network node. However, if the first/second interference level indication of the first/second frequency resource indicate(s) an interference level that is equal or above the threshold, the wireless device determines the first/second transmission power to be zero.

Embodiments herein also relate to a method performed by a network node for communicating with a wireless device in a wireless communication network, the wireless communication network employing time and frequency multiplexing. Embodiments of such a method will now be described with reference to FIG. 2.

Figure 2:
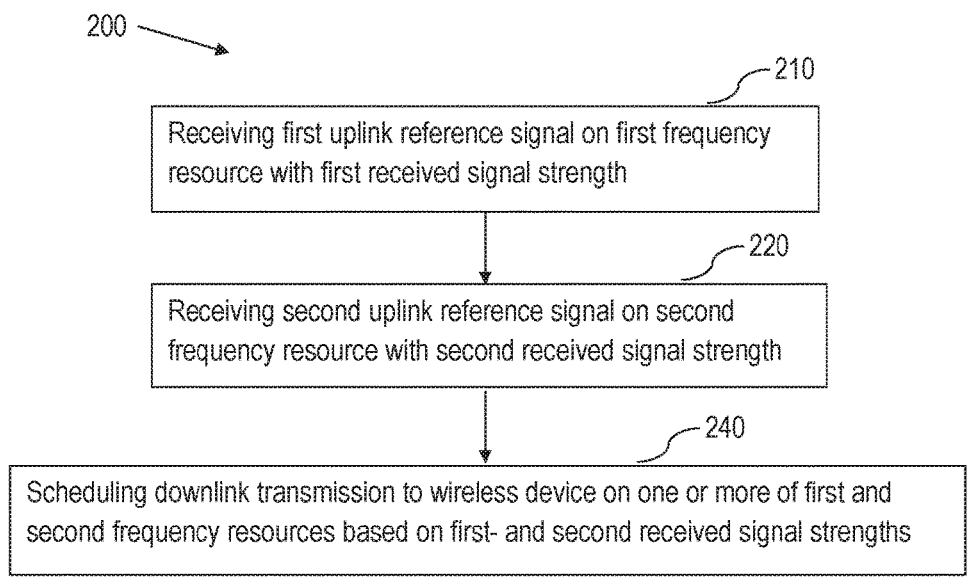
FIG. 2 is a flowchart of a method performed by a network node for communicating with wireless device in a wireless communication network, according to an exemplifying embodiment.

FIG. 2 illustrates the method 200 comprising receiving 210 a first uplink reference signal on a first frequency resource with a first received signal strength; receiving 220 a second uplink reference signal on a second frequency resource with a second received signal strength; and scheduling 240 a downlink data transmission to the wireless device on one or more of the first and second frequency resources based on the first- and the second received signal strengths.

In order for the network node to apply an optimal scheme for performing a transmission to the wireless device to be successfully received by the wireless device, the network node generally needs some information about e.g. current radio conditions. Such information may be obtained e.g. by performing measurements and/or receiving measurement reports from the wireless device. In this method performed by the network node, the network node receives the first uplink reference signal on the first frequency resource with the first received signal strength. The network node also receives the second uplink reference signal on the second frequency resource with the second received signal strength. As described above in conjunction with the method performed by the wireless device, the wireless device has transmitted the respective reference signals on respective frequency resources with respective transmission power. The respective transmission power used by the wireless for transmitting the uplink reference signal serves as information to the network node of an interference level experienced and determined by the wireless device on the respective frequency resource. The network node receives the uplink reference signal at a received signal strength, and since the received signal strength is dependant at least partly on the transmission power used by the wireless device, the received signal strength also serves as information to the network node of an interference level experienced and determined by the wireless device on the respective frequency resource.

Also as explained above, the network node generally is in control of the transmission power the wireless device should use for the uplink transmission and thereby the network node "expects" a certain received signal strength with regard to the first and the second uplink reference signal. The first and the second uplink reference signal are transmitted by the wireless device on the first and the second frequency resources respectively. The wireless device transmits the first and the second uplink reference signal using a first and a second transmission power. Due to e.g. characteristics of the channel, the network node will receive the first reference signal with the first received signal strength and receive the second reference signal with the second received signal strength, wherein the respective received signal strengths are generally somewhat lower than the transmission power with which they were transmitted by the wireless device.

It may be that the first and the second uplink reference signal are received at expected received signal strength with regard to the first and the second uplink reference signal. This may indicate to the network node that there is no or little interference on the first and the second frequency resource. However, if the received signal strength with regard to the first and/or the second uplink reference signal is zero or reduced compared to the "expected" respective received signal strength, the network node is informed that interference at least of a certain degree or level is present on the first and the second frequency resource.

If the received signal strength with regard to the first and/or the second uplink reference signal is zero or reduced compared to the "expected" respective received signal strength, the network node may take appropriate action(s) to counteract the interference experienced by the wireless device. The difference actions will be exemplified and explained below. Consequently, the network node schedules 240 the downlink data transmission to the wireless device on one or more of the first and second frequency resources based on the first- and the second received signal strengths. The network node generally comprises a scheduler which is responsible for performing the scheduling associated with wireless devices being served by the network node. The scheduler may thus receive input regarding the downlink data transmission to the wireless device on one or more of the first and second frequency resources based on the first- and the second received signal strengths, wherein the scheduler uses such information to perform the scheduling. Scheduling may also comprise allocating time and/or frequency resources for the transmission to the wireless device and also may also mapping of data, reference signals, control signalling etc. of the transmission to the allocated time and/or frequency resources as well as employing appropriate transmission power to the transmission. Scheduling may also comprise determining modulation and coding scheme (MCS) and/or determining which precoder to use for the transmission.

Receiving a reference signal with zero transmission power may correspond to failure to receive the reference signal due to the wireless device not transmitting it, i.e. transmitting it with zero transmission power.

The downlink transmission to the wireless device may comprise e.g. data, reference signalling and/or control signalling etc. as described above.

The method performed by the network node has the same several advantages as the method performed by the wireless device. One possible advantage is that a massive MIMO system may be implemented with less overhead from CSI/CQI (Channel Quality Indication) reporting in the uplink. The interference level may be reported by the wireless device using existing reference/pilot signals without requiring a separate measurement report. Furthermore, the wireless device may affect the downlink power control and modulation/coding selection, which may be utilised to optimise the downlink performance. Another possible advantage is that the channel estimation at the network node may be improved for good resources that are likely to be used for downlink transmissions by allocating power to good resources with a favorable interference situation. This is because wireless devices that are heavily interfered on some resources do not send as much power that interfere with other uplink pilots on these resources that will not be used for downlink data transmissions, hence also addressing pilot-contamination both intra and inter cell.

The scheduling 240 of the downlink data transmission may comprise adapting a beamforming for the downlink data transmission based on the received first- and second signal strengths.

There are various actions the network may take in order to counteract the interference experienced by the wireless device. There are two different scenarios, (a) the received signal strength of the first and/or the second uplink reference signal is zero, and (b) the received signal strength of the first and/or the second uplink reference signal is/are reduced compared to the "expected" received signal strength of the first and/or the second reference signal.

In both scenarios, i.e. the zero or reduced received signal strength, the network node may adapt the beamforming for the downlink data transmission. In case the received first and or the received second signal strength is/are zero, the network node may try an arbitrary beamforming. The beamforming serves to aim the downlink transmission towards the wireless device, thereby not interfering neighbouring network nodes and other wireless devices being relatively close to the receiving wireless device for which the transmission is intended. Thus the beamforming is performed in relation to the channel between the network node and the wireless device.

In the scenario that the received first and or the received second signal strength is/are reduced, the network node is provided with information pertaining to e.g. the severity of the interference experienced by the wireless device. Thus, the network node is able to tailor the beamforming in a better and/or more efficient way than if the received first and or the received second signal strength is/are zero. The beamforming may be executed by the scheduler, wherein the scheduler may control various antennas or antenna element arrays, wherein the scheduler controls the various antennas or antenna element arrays in order to achieve the bearnforming.

The scheduling 240 of the downlink data transmission may comprise determining a transmission power for the downlink data transmission based on the received first and second signal strengths of the received reference signals from the wireless device.

This is another example of an action taken by the network node when the network node is informed about the interference on the first and/or the second frequency resource as experienced by the wireless device.

The network node may thus increase or reduce the transmission power of the subsequent downlink transmission to the wireless device. The network node may further determine how much to increase or decrease the transmission power compared to the previously used one based on the received first and second signal strengths of the received reference signals from the wireless device. As described above, the wireless device may determine a specific transmission power to be used for transmitting the first and/or the second uplink reference signal on the first and/or the second frequency resource respectively. Thus, the network node may use the first and second received signal strength for determining the transmission power of the downlink transmission.

Merely as an example, e.g. when the wireless device has set the transmission power for the uplink reference signal(s) to zero, the network node may adapt its downlink transmission power over the subcarriers or frequency resources by setting the transmission power to zero at unwanted subcarriers or frequency resources. This example works well even if uplink reference signal(s) are code-multiplex and potentially is/are optimised for that all wireless devices have the same received power density at the network node.

The scheduling 240 of the downlink data transmission comprises determining a modulation and coding scheme based on the received first and second signal strengths of the received reference signals from the wireless device.

This is yet an example of an action taken by the network node when the network node is informed about the interference on the first and/or the second frequency resource as experienced by the wireless device.

The modulation and coding scheme is usually determined or selected to achieve a successful transmission using as little overhead as possible. Generally, the higher or stronger the modulation and coding scheme, the more additional bits are required and the more robust the transmission is. Further, the higher or stronger the modulation and coding scheme, the less the amount of data may be transferred or sent by means of the transmission. Thus, the network node may strive to use the lowest or weakest modulation and coding scheme that still provides a satisfactorily robust transmission. Consequently, in case the network node receives the first and the second uplink reference signal by the first and the second received signal strength respectively, the network node may determine which modulation and coding scheme to employ for the downlink transmission based on the first and the second received signal strength respectively. In an example, the lower the first and the second received signal strength, the higher or stronger the modulation and coding scheme. The modulation and coding may be performed by the scheduler or by e.g. a modulation and coding unit which may then feed the modulated and coded data to the scheduler for transmission to the wireless device.

The methods performed by the wireless device and the network node, wherein the wireless device and the network node interact, utilise measured interference levels at wireless device to affect the downlink resource allocation, without the need for explicit feedback mechanisms on the conventional control plane, i.e. by sending measurement reports. This may be particularly important in future massive MIMO systems, where e.g. the channel hardening removes the time/frequency variability of the desired signal quality and thus there is no need for channel quality feedback in interference-free scenarios. The result is that the wireless device may affect the estimated channel quality at the network node by varying the characteristics of the uplink reference signalling, in particular its power level, on a per-subcarrier, or frequency resource, basis. The wireless device may then induce a desired downlink resource allocation by indicating that the signal quality varies when it is actually the interference level that varies.

The average received SNR scales as the number of antennas, M, of the network node. However, the SNR variations around the mean may depend heavily on the number of antennas M and decreases as M increases. This can be seen from FIG. 3a where the average received SNR as well as the maximum and the minimum received SNR for 100000 random channel realisations are plotted versus the number of antennas. In this figure, the average SNR per antenna is set to 0 dB, i.e., $$\frac{P}{\sigma^2} = 1$$

and it is assumed independent Rayleigh fading where the elements of h are circularly symmetric complex Gaussian random variables with zero mean and variance 1. P is the transmitted power and $\sigma^2$ is variance of white Gaussian noise.

For illustration, the instantaneous received SNR for a random channel realisation is also plotted. As can be seen, the average SNR increases linearly as M increases and moreover the SNR variations around the mean decrease with M. Similar observations may be made for ZF precoding. This confirms the fact that in systems deploying massive number of antennas, the channel after exploiting a good precoder is almost flat and does not vary with time or frequency. In other words the channel is hardened. The channel hardening property may be utilised to simplify the power control and selection of modulation and coding, since the same choice may be used for all available frequencies and over a relatively long time period (depending on the user mobility). This one of the key benefits of massive MIMO over conventional radio access technologies.

In radio systems such as LTE, the OFDM time frequency grid is portioned into larger portions, e.g., resource blocks in LTE constituting 12 sub-carriers. This constitutes a frequency resource that is schedulable. In LTE the resource block is assumed to be within the coherence bandwidth of the channel, this means that the channel fading is assumed not to change dramatically between the sub-carriers within a resource block, hence not every sub-carrier in the downlink has a reference signal mapped for channel estimation. The channel properties on the other sub-carriers are there for interpolated (extrapolated) from the reference signal sub-carriers. This means that the DMRS and data are in the same frequency resource for a resource block although only a sub-set of the sub-carriers carry DMRS. The same is true for SRS in uplink, where a comb maps the reference signal to a sub-set of the sub-carriers but a reciprocity downlink transmission based on the channel estimate on the SRS maps downlink data to all sub-carriers in the scheduled resource blocks.

FIG. 3b is a simplified flowchart of the method performed by the wireless device and the method performed by the network node interacting. FIG. 3b illustrates the wireless device receiving a downlink transmission from the network node and estimating downlink interference on two or more subcarriers, the subcarriers being an example of the frequency resources described above. Based in the estimated downlink interference on two or more subcarriers/frequency resources, the wireless device may determine first/second interference indication(s). The wireless device then adapts uplink reference signals based on the estimated downlink interference on the two or more subcarriers and/or the determined first/second interference indication(s). The wireless device then adapts uplink reference signals based on the estimated d. In other words, the wireless device may e.g.

determine transmission power to be used for transmitting the uplink reference signals. As described in detail above, the transmission power to be used for transmitting the uplink reference signals may set to zero or to a value that will be representative for the estimated downlink interference on the two or more subcarriers to the network node. The wireless device then transmits the uplink reference signals according to the adaptation, e.g. the wireless device transmits the uplink reference signals using the determined transmission power. The network node receives the uplink reference signals at respective received signal strength and takes action based on the respective received signal strength.

The signal quality and interference estimates may be used at the wireless device to adapt its uplink transmissions to the channel conditions, as illustrated in FIGS. 1 and 3b. For simplicity of the exposition of the methods, assume that the uplink transmission includes a reference signal that the network node utilises for estimation of the channel pathgains to its antennas. The wireless device may utilise its estimates of the interference situation to select the characteristics of the transmitted uplink reference signals. In some examples, the uplink transmit reference signal power is adapted to reflect the estimated interference level. By tuning the characteristics of the uplink reference signals, the wireless device may affect the estimated uplink channel gain obtained at the network node and thereby change the characteristics of the downlink transmissions that are designed based on these uplink estimates. In some examples, the wireless device seeks downlink transmissions that counteract the interference variations. In some other examples, the wireless device seeks to reduce the downlink information transfer when the interference level is high. In another embodiment, the wireless device simply seeks to inform the network node about problems with interference on particular subcarriers or frequency resources.

Embodiments herein also relate to a wireless device for communicating with a network node in a wireless communication network. The wireless device has the same technical features, objects and advantages as the method performed by the wireless device. Hence, the wireless device will only be described in brief in order to avoid unnecessary repetition.

Figure 4:
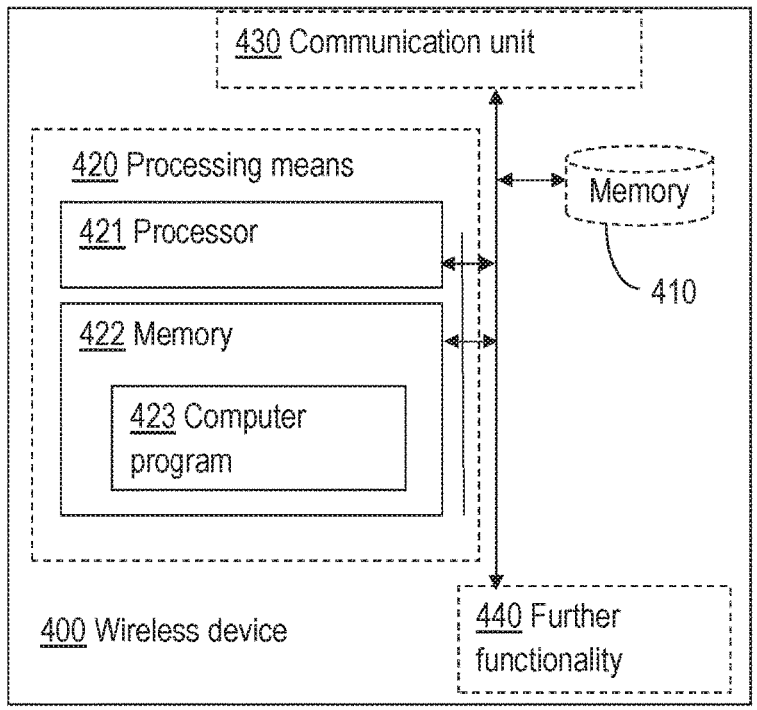
FIG. 4 is a block diagram of a wireless device for communicating with a network node in a wireless communication network, according to an exemplifying embodiment.
Figure 5:
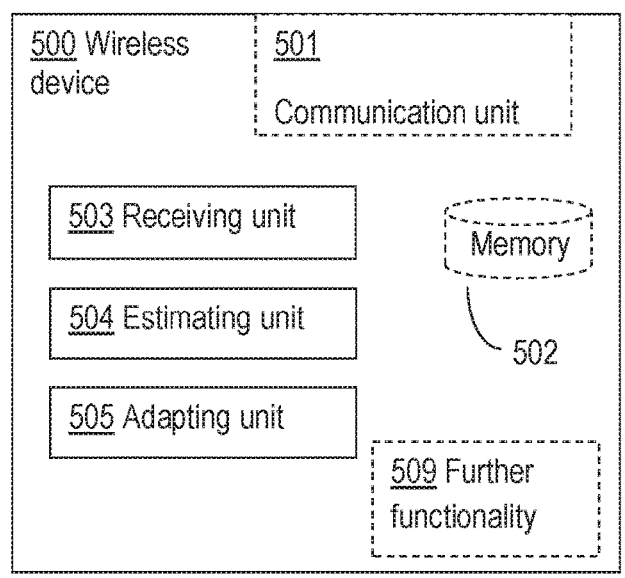
FIG. 5 is a block diagram of a wireless device for communicating with a network node in a wireless communication network, according to another exemplifying embodiment.

Embodiments of such a wireless device will now be described with reference to FIGS. 4 and 5. FIGS. 4 and 5 illustrate the wireless device 400, 500 being configured for determining a first interference level indication of a first frequency resource; and for determining a second interference level indication of a second frequency resource. The wireless device 400, 500 is further configured for transmitting a first uplink reference signal on the first frequency resource with a first transmission power; and for transmitting a second uplink reference signal on the second frequency resource with a second transmission power, wherein the first transmission power is based on the first- and second interference level indications.

The wireless device may be realised or implemented in various ways. A first exemplifying realisation or implementation is illustrated in FIG. 4. FIG. 4 illustrates the wireless device 400 comprising a processor 421 and first memory 422, the memory comprising instructions, e.g. by means of a computer program 423, which when executed by the processor 421 causes the wireless device 400 to determine a first interference level indication of a first frequency resource; and to determine a second interference level indication of a second frequency resource. The memory further comprises instructions, e.g. by means of a computer program 423, which when executed by the processor 421 causes the wireless device 400 to transmit a first uplink reference signal on the first frequency resource with a first transmission power; and to transmit a second uplink reference signal on the second frequency resource with a second transmission power, wherein the first transmission power is based on the first- and second interference level indications.

FIG. 4 also illustrates the wireless device 400 comprising a second memory 410. It shall be pointed out that FIG. 4 is merely an exemplifying illustration and second memory 410 may be optional, be a part of the first memory 422 or be a further memory of the wireless device 400. The second memory 410 may for example comprise information relating to the wireless device 400, to statistics of operation of the wireless device 400, just to give a couple of illustrating examples. FIG. 4 further illustrates the wireless device 400 comprising processing means 420, which comprises the first memory 422 and the processor 421. Still further, FIG. 4 illustrates the wireless device 400 comprising a communication unit 430. The communication unit 430 may comprise an interface through which the wireless device 400 communicates with other nodes or entities of or outside the wireless communication network as well as other communication units. FIG. 4 also illustrates the wireless device 400 comprising further functionality 440. The further functionality 440 may comprise hardware and/or software necessary for the wireless device 400 to perform different tasks that are not disclosed herein.

An alternative exemplifying realisation, or implementation, of the wireless device 400, 500 is illustrated in FIG. 5. FIG. 5 illustrates the wireless device 500 comprising a determining unit 503 for determining a first interference level indication of a first frequency resource; and for determining a second interference level indication of a second frequency resource. FIG. 5 illustrates the wireless device 500 further comprising a transmitting unit 504 for transmitting a first uplink reference signal on the first frequency resource with a first transmission power; and for transmitting a second uplink reference signal on the second frequency resource with a second transmission power, wherein the first transmission power is based on the first- and second interference level indications.

In FIG. 5, the wireless device 500 is also illustrated comprising a communication unit 501. Through this unit, the wireless device 500 is adapted to communicate with other nodes and/or entities in or outside the wireless communication network. The communication unit 501 may comprise more than one receiving arrangement. For example, the communication unit 501 may be connected to both a wire and an antenna, by means of which the wireless device 500 is enabled to communicate with other nodes and/or entities in the wireless communication network. Similarly, the communication unit 501 may comprise more than one transmitting arrangement, which in turn is connected to both a wire and an antenna, by means of which the wireless device 500 is enabled to communicate with other nodes and/or entities in the wireless communication network. The wireless device 500 further comprises a memory 502 for storing data. Further, the wireless device 500 may comprise a control or processing unit (not shown) which in turn is connected to the units 503 and 504. It shall be pointed out that this is merely an illustrative example and the wireless device 500 may comprise more, less or other units or modules which execute the functions of the wireless device 500 in the same manner as the units illustrated in FIG. 5. FIG. 5 also illustrates the wireless device 500 optionally comprising further functionality 509. The further functionality 509 may comprise hardware and/or software necessary for the wireless device 500 to perform different tasks that are not disclosed herein.

It should be noted that FIG. 5 merely illustrates various functional units in the wireless device 500 in a logical sense. The functions in practice may be implemented using any suitable software and hardware means/circuits etc. Thus, the embodiments are generally not limited to the shown structures of the wireless device 500 and the functional units. Hence, the previously described exemplary embodiments may be realised in many ways. For example, one embodiment includes a computer-readable medium having instructions stored thereon that are executable by the control or processing unit for executing the method steps in the wireless device 500. The instructions executable by the computing system and stored on the computer-readable medium perform the method steps of the wireless device 500 as set forth in the claims.

The wireless device has the same advantages as the method performed by the wireless device. One possible advantage is that a massive MIMO system may be implemented with less overhead from CSI/CQI (Channel Quality Indication) reporting in the uplink. The interference level may be reported by the wireless device using existing reference/pilot signals without requiring a separate measurement report. Furthermore, the wireless device may affect the downlink power control and modulation/coding selection, which may be utilised to optimise the downlink performance. Another possible advantage is that the channel estimation at the network node may be improved for good resources that are likely to be used for downlink transmissions by allocating power to good resources with a favorable interference situation. This is because wireless devices that are heavily interfered on some resources do not send as much power that interfere with other uplink pilots on these resources that will not be used for downlink data transmissions, hence also addressing pilot-contamination both intra and inter cell.

According to an embodiment, the second transmission power is based on the first- and second interference level indications.

According to yet an embodiment, the first transmission power is further based on a first radio channel path gain, $\beta_1$, for the first frequency resource and the second transmission power is based on a second radio channel path gain, $\beta_2$, for the second frequency resource.

According to still an embodiment, the first interference level indication is determined based on a first downlink reference signal.

According to another embodiment, the second interference level indication is determined based on a second downlink reference signal.

According to a further embodiment, the first transmission power is equal to, or lower, than the second transmission power if the first interference level indication indicates a higher interference level than the second interference level indication.

Embodiments herein also relate to a network node for communicating with a wireless device in a wireless communication network, the wireless communication network employing time and frequency multiplexing. The network node has the same technical features, objects and advantages as the method performed by the network node. Hence, the network node will only be described in brief in order to avoid unnecessary repetition.

Figure 6:
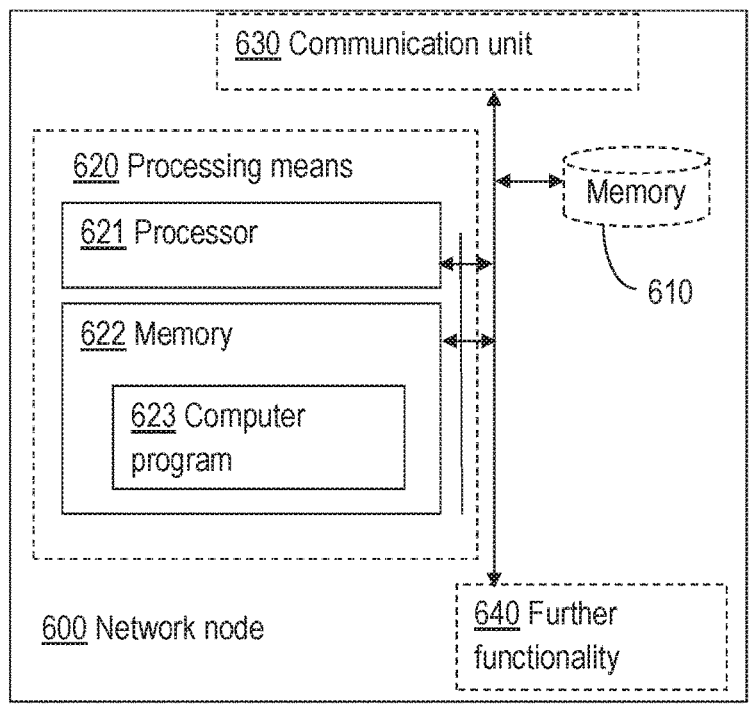
FIG. 6 is a block diagram of a network node for communicating with wireless device in a wireless communication network, according to an exemplifying embodiment.
Figure 7:
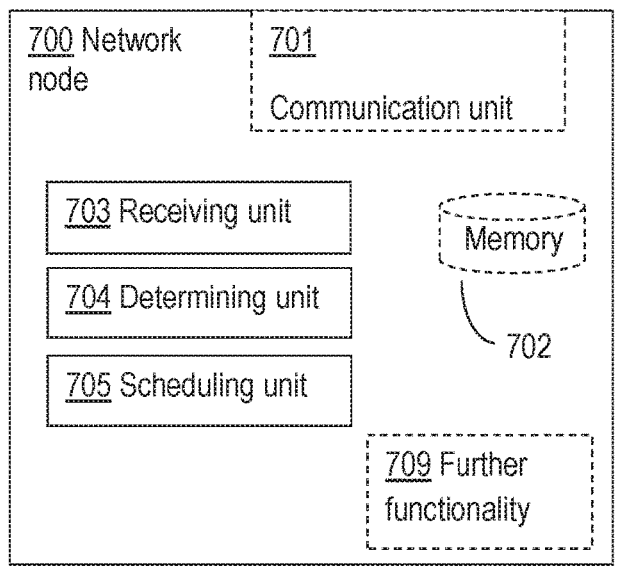
FIG. 7 is a block diagram of a network node for communicating with wireless device in a wireless communication network, according to another exemplifying embodiment.
Figure 8:
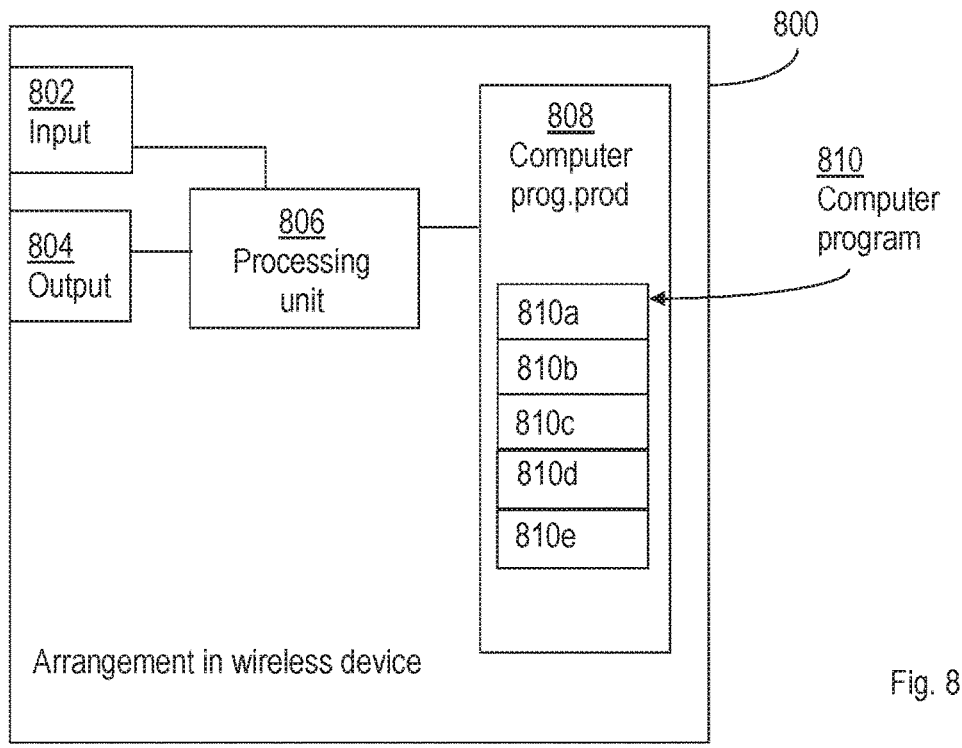
FIG. 8 is a block diagram of an arrangement of a wireless device for communicating with a network node in a wireless communication network, according to an exemplifying embodiment.
Figure 9:
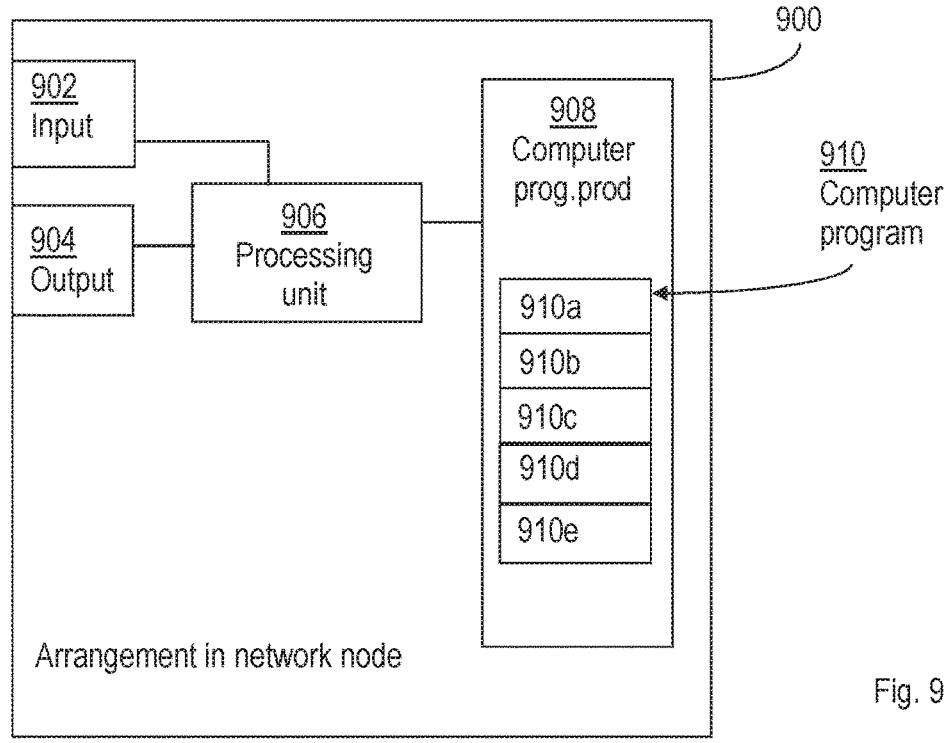
FIG. 9 is a block diagram of an arrangement of a network node for communicating with wireless device in a wireless communication network, according to an exemplifying embodiment.

Embodiments of such a network node will now be described with reference to FIGS. 6 and 7. FIGS. 6 and 7 illustrate the network node 600, 700 being configured for receiving a first uplink reference signal on a first frequency resource with a first received signal strength; and for receiving a second uplink reference signal on a second frequency resource with a second received signal strength. The network node 600, 700 is further configured for scheduling a downlink data transmission to the wireless device on one or more of the first and second frequency resources based on the first- and the second received signal strengths.

The network node may be realised or implemented in various ways. A first exemplifying realisation or implementation is illustrated in FIG. 6. FIG. 6 illustrates the network node 600 comprising a processor 621 and first memory 622, the memory comprising instructions, e.g. by means of a computer program 623, which when executed by the processor 621 causes the network node 600 to be operable to receive a first uplink reference signal on a first frequency resource with a first received signal strength; and to receive a second uplink reference signal on a second frequency resource with a second received signal strength. The memory further comprises instructions, e.g. by means of a computer program 623, which when executed by the processor 621 causes the network node 600 to schedule a downlink data transmission to the wireless device on one or more of the first and second frequency resources based on the first- and the second received signal strengths.

FIG. 6 also illustrates the network node 600 comprising a second memory 610. It shall be pointed out that FIG. 6 is merely an exemplifying illustration and second memory 610 may be optional, be a part of the first memory 622 or be a further memory of the network node 600. The second memory 610 may for example comprise information relating to the network node 600, to statistics of operation of the network node 600, just to give a couple of illustrating examples. FIG. 6 further illustrates the network node 600 comprising processing means 620, which comprises the first memory 622 and the processor 621. Still further, FIG. 6 illustrates the network node 600 comprising a communication unit 630. The communication unit 630 may comprise an interface through which the network node 600 communicates with other nodes or entities of or outside the wireless communication network as well as other communication units. FIG. 6 also illustrates the network node 600 comprising further functionality 640. The further functionality 640 may comprise hardware and/or software necessary for the network node 600 to perform different tasks that are not disclosed herein.

An alternative exemplifying realisation, or implementation, of the network node 600, 700 is illustrated in FIG. 7. FIG. 7 illustrates the network node 700 comprising a receiving unit 703 for receiving a first uplink reference signal on a first frequency resource with a first received signal strength; and for receiving a second uplink reference signal on a second frequency resource with a second received signal strength. FIG. 7 illustrates the network node 700 further comprising a scheduling unit 704 for scheduling a downlink data transmission to the wireless device on one or more of the first and second frequency resources based on the first- and the second received signal strengths.

In FIG. 7, the network node 700 is also illustrated comprising a communication unit 701. Through this unit, the network node 700 is adapted to communicate with other nodes and/or entities in or outside the wireless communication network. The communication unit 701 may comprise more than one receiving arrangement. For example, the communication unit 701 may be connected to both a wire and an antenna, by means of which the network node 700 is enabled to communicate with other nodes and/or entities in the wireless communication network. Similarly, the communication unit 701 may comprise more than one transmitting arrangement, which in turn is connected to both a wire and an antenna, by means of which the network node 700 is enabled to communicate with other nodes and/or entities in the wireless communication network. The network node 700 further comprises a memory 702 for storing data. Further, the network node 700 may comprise a control or processing unit (not shown) which in turn is connected to the units 703 and 704. It shall be pointed out that this is merely an illustrative example and the network node 700 may comprise more, less or other units or modules which execute the functions of the network node 700 in the same manner as the units illustrated in FIG. 7. FIG. 7 also illustrates the network node 700 optionally comprising further functionality 709. The further functionality 709 may comprise hardware and/or software necessary for the network node 700 to perform different tasks that are not disclosed herein.

It should be noted that FIG. 7 merely illustrates various functional units in the network node 700 in a logical sense. The functions in practice may be implemented using any suitable software and hardware means/circuits etc. Thus, the embodiments are generally not limited to the shown structures of the network node 700 and the functional units. Hence, the previously described exemplary embodiments may be realised in many ways. For example, one embodiment includes a computer-readable medium having instructions stored thereon that are executable by the control or processing unit for executing the method steps in the network node 700. The instructions executable by the computing system and stored on the computer-readable medium perform the method steps of the network node 700 as set forth in the claims.

The network node has the same advantages as the method performed by the network node. One possible advantage is that a massive MIMO system may be implemented with less overhead from CSI/CQI (Channel Quality Indication) reporting in the uplink. The interference level may be reported by the wireless device using existing reference/pilot signals without requiring a separate measurement report. Furthermore, the wireless device may affect the downlink power control and modulation/coding selection, which may be utilised to optimise the downlink performance. Another possible advantage is that the channel estimation at the network node may be improved for good resources that are likely to be used for downlink transmissions by allocating power to good resources with a favorable interference situation. This is because wireless devices that are heavily interfered on some resources do not send as much power that interfere with other uplink pilots on these resources that will not be used for downlink data transmissions, hence also addressing pilot-contamination both intra and inter cell.

According to an embodiment, the network node 600, 700 is configured for scheduling the downlink data transmission by adapting a beamforming for the downlink data transmission based on the received first- and second signal strengths.

According to an embodiment, the network node 600, 700 is configured for scheduling the downlink data transmission by determining a transmission power for the downlink data transmission based on the received first and second signal strengths of the received reference signals from the wireless device.

According to an embodiment, the network node 600, 700 is configured for scheduling the downlink data transmission by determining a modulation and coding scheme based on the received first and second signal strengths of the received reference signals from the wireless device.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by a wireless device for communicating with a network node in a wireless communication network, the method comprising:
   determining a first interference level indication of a first frequency resource;
   determining a second interference level indication of a second frequency resource, wherein determining the first interference level indication comprises measuring interference for the first downlink reference signal as received at the wireless device and determining the second interference level indication comprises measuring interference for the second downlink reference signal as received at the wireless device;
   transmitting a first uplink reference signal on the first frequency resource with a first transmission power; and
   transmitting a second uplink reference signal on the second frequency resource with a second transmission power, wherein the first transmission power deviates from an uplink transmit power level set by the network node, based on the on the first and second interference level indications; wherein the first transmission power deviating from the uplink transmit power level set by the network node comprises:
   determining the first transmission power according to a first function that specifies a deviation from a transmit power level set by the network for transmission of the first uplink reference signal, in dependence on the presence or amount of interference on the first and second frequency resources, as determined from the measured interference for the first and second downlink reference signals.

2. The method according to claim 1, wherein the second transmission power deviates from an uplink transmit power level set by the network node, based on the first and second interference level indications.

3. The method according to claim 1, wherein the first transmission power is further based on a first radio channel path gain for the first frequency resource and the second transmission power is further based on a second radio channel path gain for the second frequency resource.

4. The method according to claim 1, wherein the first interference level indication is determined based on a first downlink reference signal.

5. The method according to claim 1, wherein the second interference level indication is determined based on a second downlink reference signal.

6. The method according to claim 1, wherein the first transmission power is equal to or lower than the second transmission power if the first interference level indication indicates a higher interference level than the second interference level indication.

7. The method of claim 1, further comprising determining the second transmission power according to a second function that specifies a deviation from a transmit power level set by the network for transmission of the second uplink reference signal, in dependence on the presence or amount of interference on one or both the first and second frequency resources, as determined from the measured interference for one or both the first and second downlink reference signals.

8. The method of claim 1, wherein the first and second frequency resources are within a same system bandwidth associated with the network node.

9. A method performed by a network node for communicating with a wireless device in a wireless communication network, the wireless communication network employing time and frequency multiplexing, the method comprising:
receiving, from the wireless device, a first uplink reference signal on a first frequency resource with a first received signal strength;
receiving, from the wireless device, a second uplink reference signal on a second frequency resource with a second received signal strength; and
scheduling a downlink data transmission to the wireless device on one or more of the first and second frequency resources, based on the first and the second received signal strengths in relation to corresponding expected received signal strengths for the first and second uplink reference signals; wherein scheduling the downlink data transmission to the wireless device on one or more of the first and second frequency resources comprises:
inferring the presence or the amount of interference at the wireless device on one or both the first and second frequency resources, based on comparing the first and second received signal strengths to the corresponding expected signal strengths, the corresponding expected signal strengths being based on one or more transmit power levels set by the network node for transmission by the wireless device of the first and second uplink reference signals, and wherein the wireless device is operative to deviate from the one or more set transmit power levels responsive to the presence or the amount of interference on the first and second frequency resources; and
controlling a downlink resource allocation for the downlink data transmission in dependence on the inferred presence or amount of interference.

10. The method according to claim 9, wherein the scheduling of the downlink data transmission comprises adapting a beamforming for the downlink data transmission, based on the first and second received signal strengths in relation to the corresponding expected received signal strengths.

11. The method according to claim 9, wherein the scheduling of the downlink data transmission comprises determining a transmission power for the downlink data transmission, based on the first and second received signal strengths in relation to the corresponding expected received signal strengths.

12. The method according to claim 9, wherein the scheduling of the downlink data transmission comprises determining a modulation and coding scheme, based on the first and second received signal strengths in relation to the corresponding expected received signal strengths.

13. The method of claim 9, wherein the first and second frequency resources are within a same system bandwidth associated with the network node.

14. A wireless device configured for communicating with a network node in a wireless communication network, the wireless device comprising:
communication circuitry configured for communicating with the network node; and
processing circuitry operatively associated with the communication circuitry and configured to:
determine a first interference level indication of a first frequency resource;
determine a second interference level indication of a second frequency resource, wherein determining the first interference level indication comprises measuring interference for the first downlink reference signal as received at the wireless device and determining the second interference level indication comprises measuring interference for the second downlink reference signal as received at the wireless device;
transmit a first uplink reference signal on the first frequency resource with a first transmission power; and
transmit a second uplink reference signal on the second frequency resource with a second transmission power, wherein the first transmission power deviates from an uplink transmit power level set by the network node, based on the first and second interference level indications; wherein the first transmission power deviating from the uplink transmit power level set by the network node comprises:
determining the first transmission power according to a first function that specifies a deviation from a transmit power level set by the network for transmission of the first uplink reference signal, in dependence on the presence or amount of interference on the first and second frequency resources, as determined from the measured interference for the first and second downlink reference signals.

15. The wireless device according to claim 14, wherein the second transmission power deviates from an uplink transmit power level set by the network node, based on the first and second interference level indications.

16. The wireless device according to claim 14, wherein the first transmission power is further based on a first radio channel path gain for the first frequency resource and the second transmission power is further, based on a second radio channel path gain for the second frequency resource.

17. The wireless device according to claim 14, wherein the first interference level indication is determined based on a first downlink reference signal.

18. The wireless device according to claim 14, wherein the second interference level indication is determined based on a second downlink reference signal.

19. The wireless device according to claim 14, wherein the first transmission power is equal to or lower than the second transmission power if the first interference level indication indicates a higher interference level than the second interference level indication.

20. A network node configured for communicating with a wireless device in a wireless communication network, the wireless communication network employing time and frequency multiplexing, the network node comprising:
communication circuitry configured for communicating with the wireless device; and
processing circuitry operatively associated with the communication circuitry and configured to:
receive, from the wireless device, a first uplink reference signal on a first frequency resource with a first received signal strength;
receive, from the wireless device, a second uplink reference signal on a second frequency resource with a second received signal strength; and
schedule a downlink data transmission to the wireless device on one or more of the first and second frequency resources, based on the first and second received signal strengths in relation to corresponding expected received signal strengths for the first and second uplink reference signals; wherein scheduling the downlink data transmission to the wireless device on one or more of the first and second frequency resources comprises:

inferring the presence or the amount of interference at the wireless device on one or both the first and second frequency resources, based on comparing the first and second received signal strengths to the corresponding expected signal strengths, the corresponding expected signal strengths being based on one or more transmit power levels set by the network node for transmission by the wireless device of the first and second uplink reference signals, and wherein the wireless device is operative to deviate from the one or more set transmit power levels responsive to the presence or the amount of interference on the first and second frequency resources; and controlling a downlink resource allocation for the downlink data transmission in dependence on the inferred presence or amount of interference.

21. The network node according to claim 20, wherein the processing circuitry is configured to schedule the downlink data transmission by adapting a beamforming for the downlink data transmission, based on the first and second received signal strengths in relation to the corresponding expected received signal strengths.

22. The network node according to claim 20, wherein the processing circuitry is configured to schedule the downlink data transmission by determining a transmission power for the downlink data transmission, based on the first and second received signal strengths in relation to the corresponding expected received signal strengths.

23. The network node according to claim 20, wherein the processing circuitry is configured to schedule the downlink data transmission by determining a modulation and coding scheme, based on the first and second received signal strengths in relation to the corresponding expected received signal strengths.

* * * * *